United States Patent [19]

Rousch

[11] Patent Number: 5,427,292
[45] Date of Patent: Jun. 27, 1995

[54] TRAVELER'S TRAY

[76] Inventor: Paula M. Rousch, 856 W. 250 South, Albion, Ind. 46701-9617

[21] Appl. No.: 214,560

[22] Filed: Mar. 18, 1994

[51] Int. Cl.⁶ .............................................. B60N 3/10
[52] U.S. Cl. .................... 224/275; 224/273; 224/277; 224/42.01; 108/25
[58] Field of Search ............ 224/275, 273, 277, 42.01, 224/42.42, 42.45 R; 108/43, 44, 45, 25; 312/231, 233

[56] References Cited

U.S. PATENT DOCUMENTS

| | | | |
|---|---|---|---|
| 2,783,109 | 2/1957 | Frey | 311/25 |
| 2,986,438 | 5/1961 | Smathers et al. | 311/21 |
| 3,181,483 | 5/1965 | De Vitt et al. | 108/25 |
| 3,939,986 | 2/1976 | Pierro | 211/74 |
| 4,453,788 | 2/1984 | Russell | 312/231 |
| 4,765,583 | 8/1988 | Tenner | 248/444 |
| 4,770,107 | 9/1988 | Miller | 108/44 |
| 4,795,210 | 1/1989 | Milat | 297/194 |
| 4,872,723 | 10/1989 | Kopf | 297/216 |
| 4,940,003 | 7/1990 | Mayhew et al. | 108/44 |
| 5,046,433 | 9/1991 | Kramer et al. | 108/44 |
| 5,069,375 | 12/1991 | Flick | 224/273 |
| 5,170,720 | 12/1992 | Scheurer | 108/44 |
| 5,188,421 | 2/1993 | Arseneault | 297/182 |

Primary Examiner—Robert M. Fetsuga
Assistant Examiner—Peter S. Hrycko
Attorney, Agent, or Firm—Richard C. Litman

[57] ABSTRACT

A tray for use by both children and adults while traveling in an automobile has a box-like frame and is supported by hinged panel legs. The box-like frame has a food serving surface on one side, a smooth desk surface on the opposite side, and a storage compartment within the box-like frame. A hinged door provides access to the storage compartment. The tray is placed over the legs of a user and secured to the user's seat belt. The hinged panel legs may be rotated 180 degrees to allow the tray to be used as a food tray in the normal position and as a desk when the box frame is inverted. In an alternative embodiment, the tray includes a food serving surface supported by hinged legs which may fold under the food serving surface for storage. A storage bag, which may be attached to the back of a passenger seat, provides for convenient storage of the folded tray.

2 Claims, 5 Drawing Sheets

TRAVELER'S TRAY

BACKGROUND OF THE INVENTION

1. Field of the Invention

The present invention relates to seat-mounted food service trays and storage compartments.

2. Description of the Prior Art

When traveling in an automobile, especially on long trips, the occupants often need to be supplied with entertainment as well as refreshment. Children especially tend to become restless and irritable during long trips, and that adventure known as travelling with children becomes even more challenging when these restless blessings must eat and ride. The present invention is directed to the provision of a tray and desk which may be placed over the legs of a user sitting in either the front or back seat of a vehicle.

Various types of trays for use in vehicles are known in the prior art. Many of the prior art trays rest on the seat or floor of a vehicle, but cannot be placed over the leg of the user. These trays are not easily accessible by children secured in their seat belt, and consequently a great deal of spillage occurs. Other trays rest directly on the lap of a user, and can become very uncomfortable during long trips. In addition, articles on these lap trays are easily displaced by even slight movement of the user. Many of the prior art trays are also limited to use in the back seat of a car.

U.S. Pat. No. 3,939,989, issued to Joseph W. Pierro on Feb. 24, 1976, discloses an Adjustable Support Means for supporting a tray on the seat back or arm rest of a car. The device, however, does not provide a tray which may be comfortably placed in front of a user and used as either a food tray or a desk.

U.S. Pat. No. 4,453,788, issued to Jack M. Russel on Jan. 12, 1984, discloses a Portable Desk designed for use on a vehicle steering wheel. The Portable Desk includes a storage compartment but does not include legs which would allow comfortable placement of the device over the leg of a user.

U.S. Pat. No. 4,765,583, issued to Wanda C. Tenner on Aug. 23, 1988, discloses a Lap Desk for use by children while traveling in an automobile. The Lap Desk is not supported by legs, but instead rests directly on the lap of the user, and thus fails to provide the comfort of the present invention.

U.S. Pat. No. 4,770,107, issued to Deborah S. Miller on Sep. 13, 1988, discloses a Portable Travel Tray for mounting in conjunction with a conventional automobile seat positioned in the front of the user. Unlike the present invention, the Portable Travel Tray cannot be used in the front seat of a vehicle.

U.S. Pat. No. 4,795,210, issued to Lloyd E. Milat on Jan. 3, 1989, discloses a Portable Table For Use In Vehicles. The Portable Table may be placed on either the driver side or the passenger side of a two door vehicle but can not be used both as a food tray and a desk. In addition, the legs of the Portable Table may not be folded as in the present invention.

U.S. Pat. No. 4,940,003, issued to Susan L. Mayhew et al. on Jul. 10, 1990, discloses a Car Seat Table designed for securement on a horizontal seat portion of a rear vehicle seat utilizing a conventional central seat beat. The design of the Car Seat Table prevents placement of the invention over the legs of the user.

U.S. Pat. No. 5,046,433, issued to Randall Kramer et al. on Sep. 10, 1991, discloses an Adjustable Folding Tray Apparatus For Attachment To A Vehicle Seat Back. The Adjustable Tray Apparatus must be attached to the headrest of a vehicle and cannot be used in the front seat of a vehicle.

U.S. Pat. No. 5,170,720, issued to Robert S. Scheurer on Dec. 15, 1992, discloses an Adjustable Car Table for use in an automobile. The Adjustable Car Table is supported on one end by an automobile seat, and is supported on its opposite end by an adjustable height leg stand, but may not be placed over the legs of the user.

U.S. Pat. No. 5,188,421, issued to Barbara Arseneault on Feb. 23, 1993, discloses an Entertainment And Feeding Device For Use By Children In Automobiles. The Entertainment and Feeding Device includes an attached food tray which may be detached and inverted to act as a flat play surface. However, this device can be used only in the back seat of an automobile.

None of the above inventions and patents, taken either singly or in combination, is seen to describe the instant invention as claimed.

SUMMARY OF THE INVENTION

In view of the foregoing disadvantage inherent in the known types of support means used in vehicles now present in the prior art, the present invention provides an improved tray for use in vehicles. As such, the general purpose of the present invention, which will be described in greater detail, is to provide a new and improved tray for use in vehicles which has all the advantages of the prior art trays but none of their disadvantages.

To attain this, a representative embodiment of the concepts of the present invention is illustrated in the drawings and makes use of a box-like frame having a top surface and a bottom surface. The top surface includes recessed areas for containing food and supporting beverage containers. The bottom surface is smooth and may be used as a desk when the tray is inverted. A hinged door provides access to the interior of the box-like frame. The box-like frame is supported by two legs connected by hinges to opposing sides of the box-like frame. The legs are pivoted to the down position to support the tray in the upright position, and pivoted up against the sides of the box-like frame to support the tray in the inverted position. Straps are provided to secure the tray to the seat beat of the user.

Accordingly, it is a principal object of the invention to provide a novel support means which may be secured over the legs of the user and conveniently stored when not in use.

It is another object of the invention to provide a novel support means for use in both the front seat and back seat of a vehicle.

It is a further object of the invention to provide a novel support means for which may be used as a desk, a food tray, and as a storage compartment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
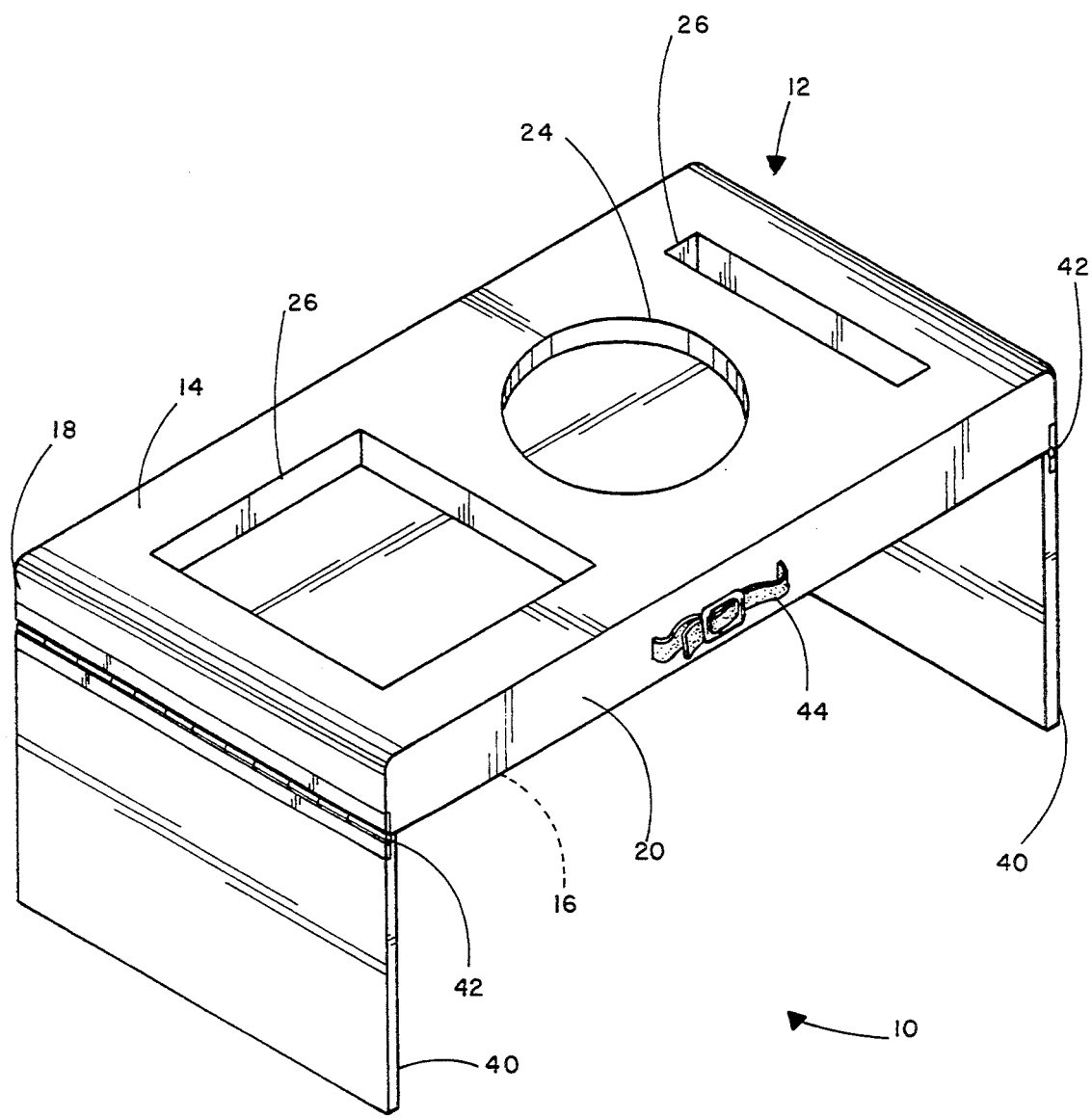
FIG. 1 is a rear perspective view of a new and improved tray which is constructed according to a first preferred embodiment of the present invention.
Figure 2:
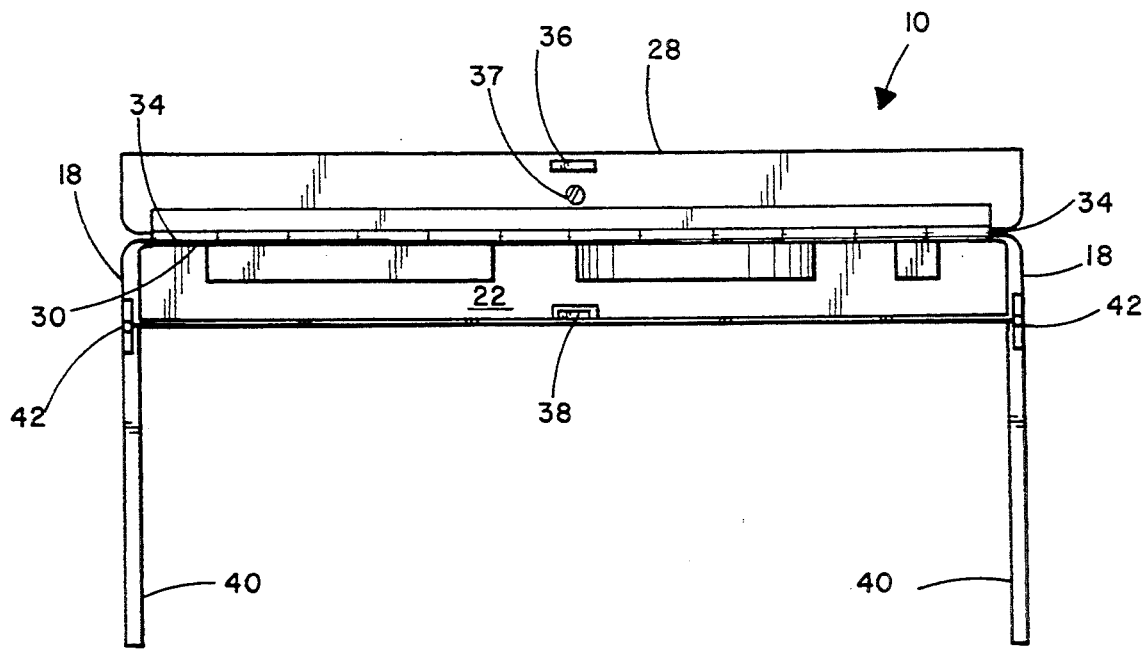
FIG. 2 is a front elevational view thereof with the tray compartment door open.
Figure 3:
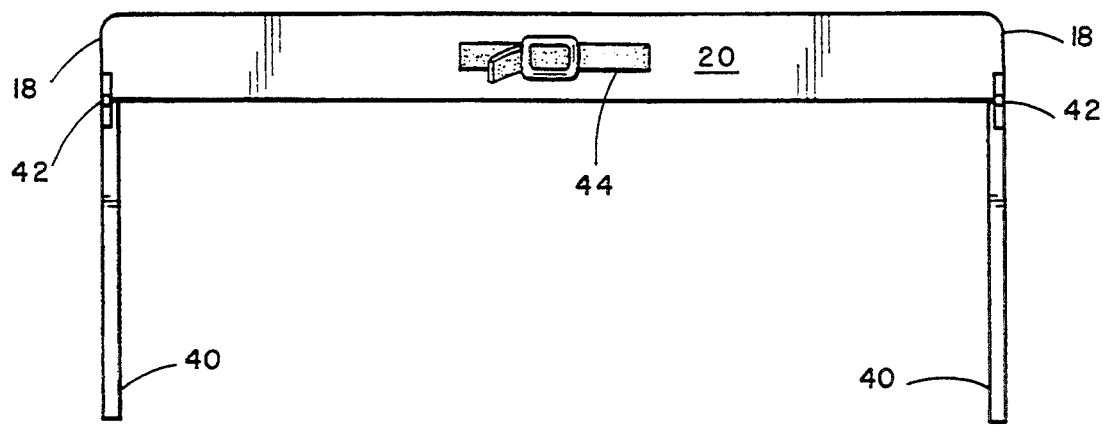
FIG. 3 is a rear elevational view thereof with the tray compartment door closed.

Referring now to the drawings and particularly to FIGS. 1, 2, and 3, a new and improved tray for use in a vehicle embodying the principles and concepts of the present invention and generally designated by the reference number 10 will be described. As shown in FIG. 1, the first embodiment 10 of the invention includes a box-like frame 12. The box-like frame 12 includes a top food surface 14, a bottom desk surface 16, two side walls 18, and a rear wall 20 which together define a compartment 22 (see FIG. 2) within the box-like frame 12. The top food surface 14 has a beverage container receptacle 24 and recessed areas 26 for the placement of food and eating utensils. As shown in FIG. 2, a door 28 for the compartment 22 is provided and connected to the upper edge 30 of the top food surface 14 by a piano hinge 34. A conventional magnetic latching mechanism 36,38 may be fixed to the door 28 and the bottom desk surface 16 to secure the door 28 in the closed position. A knob 37 attached to the door 28 facilitates the opening and closing of the door 28.

The box-like frame 12 is supported by panel legs 40 connected to frame 12 by piano hinges 42. The piano hinges 42 allow the legs 40 to rotate outwardly and upwardly 180 degrees. In the rotated position, the legs 40 rest against the side walls 18 of the box-like frame 12 and allow the tray 10 to be inverted and used as a desk. The tray 10 may therefore be placed over the legs of the user in the normal or inverted position and used either as a food tray or a desk. As shown in FIG. 1 and FIG. 3, the tray 10 is secured to the seat belt of a user using cloth straps 44 attached to the rear wall 20 of the box-like frame 12. For this particular embodiment, the tray be has a length of 22 inches, a width of 12 inches, and a total height of 10 inches when used as a food tray. The box-like frame 12 has a height of 2 inches.

Figure 4:
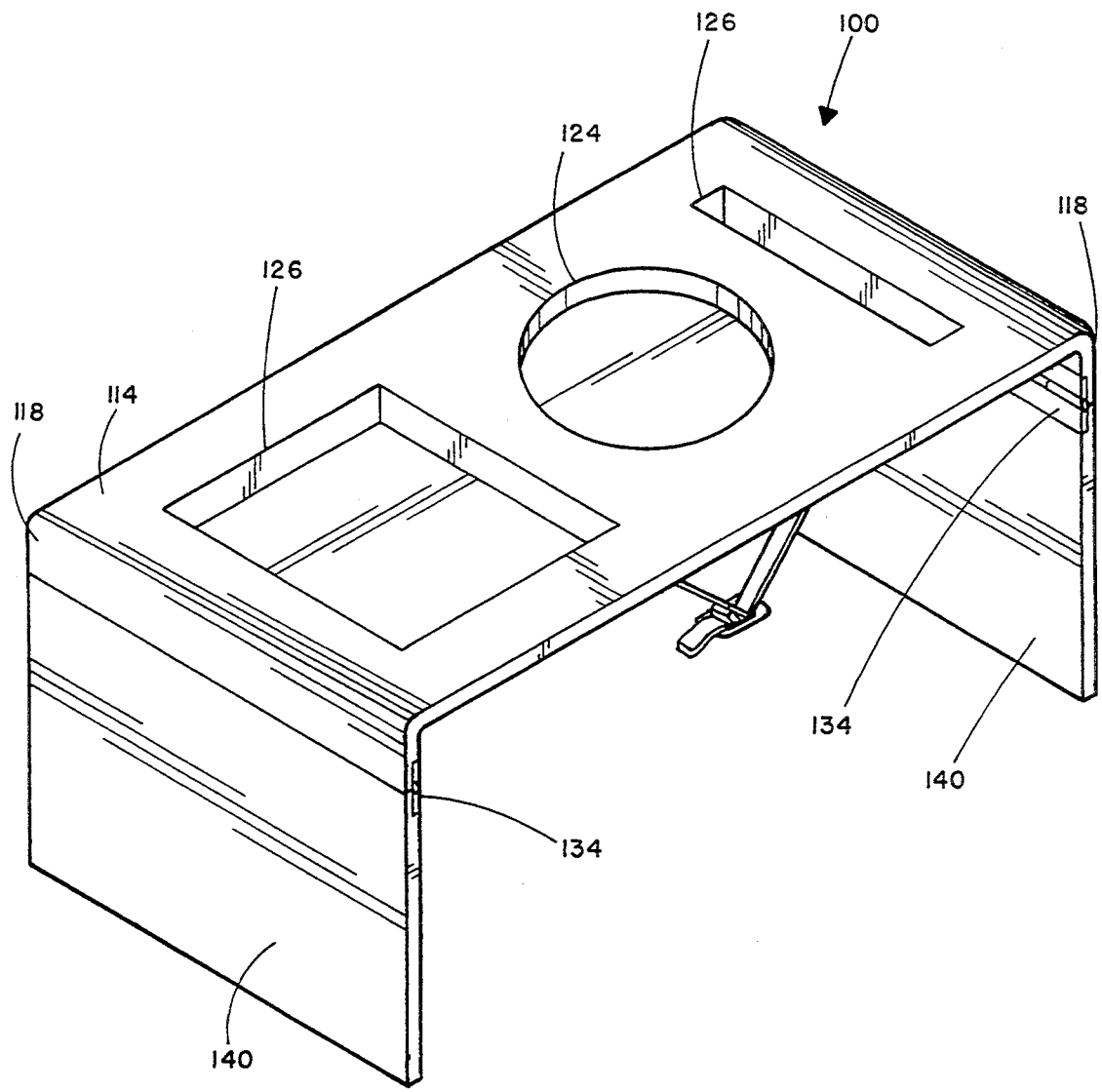
FIG. 4 is a perspective view of an alternative embodiment.
Figure 5:
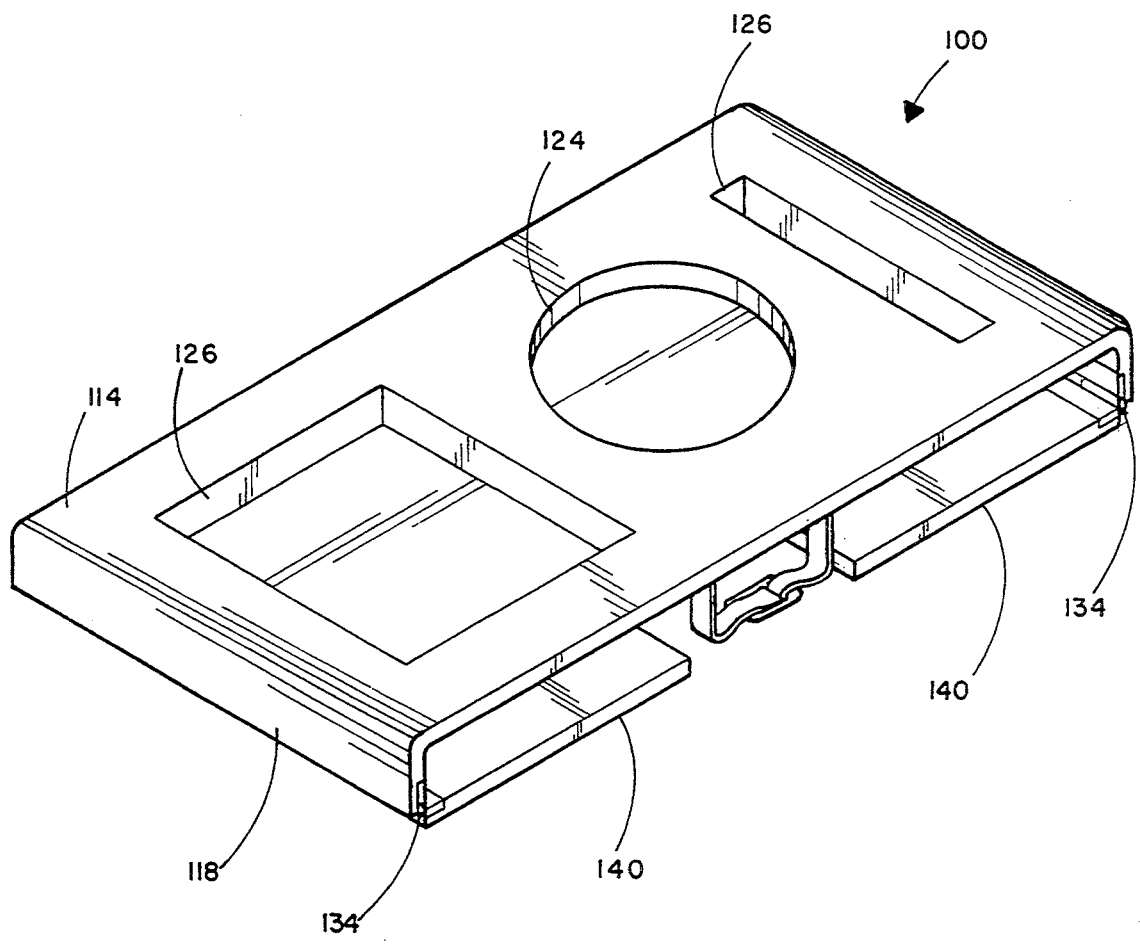
FIG. 5 is a perspective view of the alternative embodiment shown in FIG. 4 with the legs folded.
Figure 6:
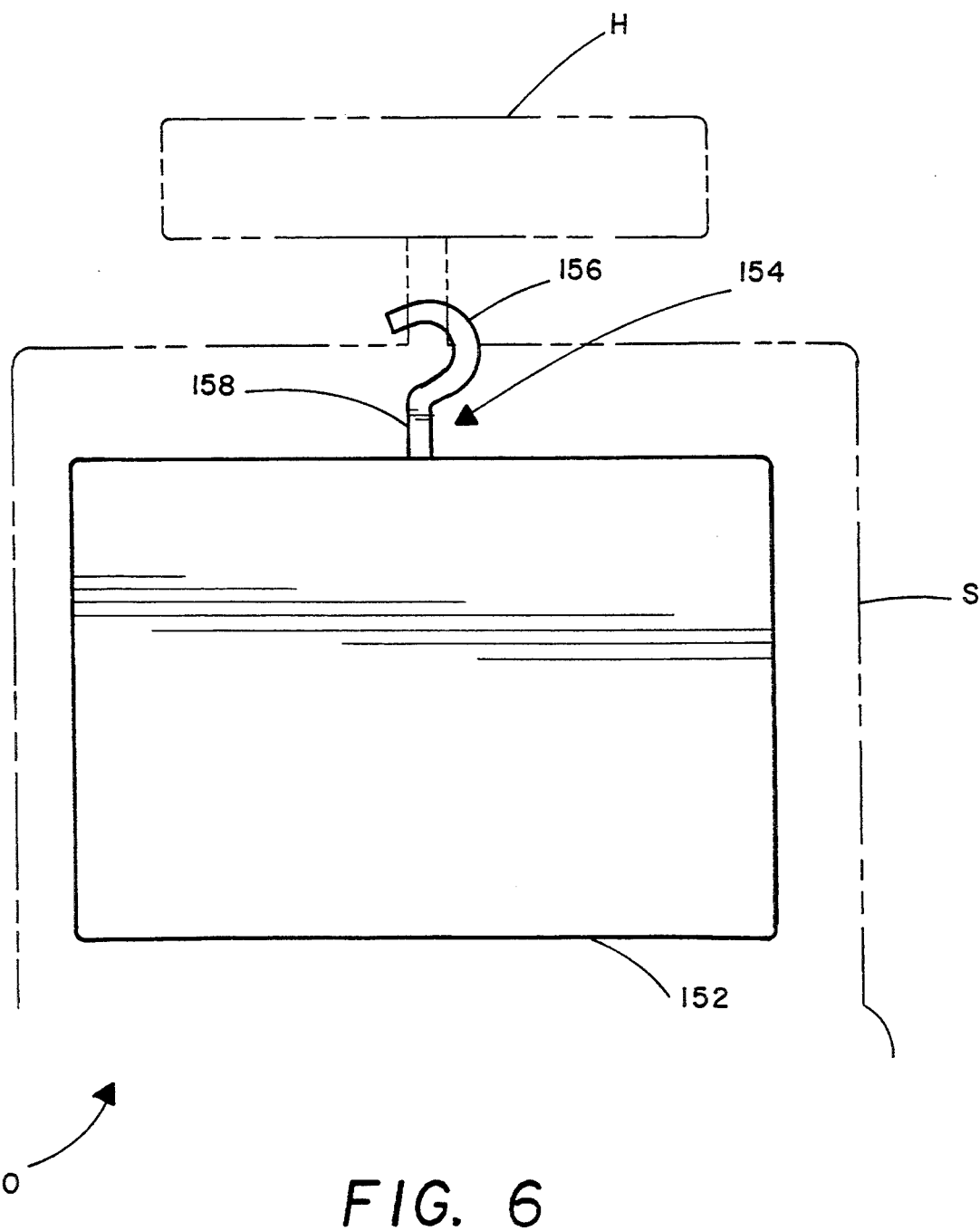
FIG. 6 is an environmental view showing a storage bag for the alternative embodiment.

An alternative embodiment 100 is shown in FIGS. 4, 5, and 6. In the alternative embodiment, the tray 100 includes a top food surface 114, and two side walls 118. The top food surface 114 has a beverage container receptacle 124 and recessed areas 126 for the placement of food and eating utensils. The top food surface 114 is supported by two panel legs 140. The panel legs 140 are connected to the top food surface 114 by piano hinges 134. The piano hinges 134 allow the legs 140 to be folded 90 degrees towards each other as shown in FIG. 5. With the legs 140 in the folded position, the tray 100 may be easily stored in the storage bag 150 provided (see FIG. 6). The storage bag 150 includes a storage compartment 152 dimensioned and configured to receive the tray 100, and a handle portion 154. The handle portion 154 includes a hook 156 attached to a strap 158, which in turn is connected to the storage compartment 152. The storage bag 150 allows the folded tray 100 to be conveniently stored behind the seat S of a vehicle, using the hook 156 to secure the bag 150 to the headrest H of a passenger seat S.

It is to be understood that the present invention is not limited to the embodiments described above, but encompasses any and all embodiments within the scope of the following claims.

I claim:

1. A new and improved tray for use in a vehicle, comprising:
    a box-like frame including,
        a top food tray surface, said top food surface including a upstanding beverage container receptacle, a first recessed area formed on said top food surface, and a second recessed area formed on said top food surface,
        a bottom desk surface,
        a rear wall,
        a first side wall,
        a second side wall, and
        a compartment within said box-like frame defined by said top food surface, said bottom desk surface, said rear wall, said first side wall, and said second side wall;
    a door for said compartment, said door hingedly connected to a front edge of said top food surface;
    a first leg hingedly connected along a bottom edge of said first side wall;
    a second leg hingedly connected along a bottom edge of said second side wall; and
    means for securing said box-like frame to a seat belt.

2. A new and improved tray for use in a vehicle according to claim 1, wherein said means of securing said box-like frame to a seat belt comprise:
    a first strap member, said first strap member having a first end and a second end, said first end secured to said rear wall of said box-like frame; and
    a second strap member, said second strap member having a first end and a second end, said first-end secured to said rear wall of said box-like frame.

* * * * *